(12) United States Patent
Tam et al.

(10) Patent No.: US 10,102,567 B2
(45) Date of Patent: Oct. 16, 2018

(54) USER CURATED COLLECTIONS FOR AN ONLINE APPLICATION ENVIRONMENT

(75) Inventors: Jia Wei Tam, Seattle, WA (US); David Notario, Seattle, WA (US); Shannon P. Guymon, Palo Alto, CA (US); Michael Reutov, Moscow (RU); Lennart Kolmodin, Moscow (RU); Dmitry Chernenkov, Moscow (RU)

(73) Assignee: Google LLC, Mountain View, CA (US)

( * ) Notice: Subject to any disclaimer, the term of this patent is extended or adjusted under 35 U.S.C. 154(b) by 946 days.

(21) Appl. No.: 14/405,949

(22) PCT Filed: Jun. 7, 2012

(86) PCT No.: PCT/RU2012/000442
§ 371 (c)(1),
(2), (4) Date: Dec. 8, 2014

(87) PCT Pub. No.: WO2013/184018
PCT Pub. Date: Dec. 12, 2013

(65) Prior Publication Data
US 2015/0149329 A1  May 28, 2015

(51) Int. Cl.
*G06Q 30/06* (2012.01)
*G06F 8/60* (2018.01)

(52) U.S. Cl.
CPC .......... *G06Q 30/0643* (2013.01); *G06F 8/60* (2013.01)

(58) Field of Classification Search
CPC ............................... G06Q 30/00; G06Q 30/06
See application file for complete search history.

(56) References Cited

U.S. PATENT DOCUMENTS 7,444,597 B2 * 10/2008 Perantatos ............ G06F 3/0486
  707/E17.116
7,818,350 B2 * 10/2010 New .................. G06F 17/30766
  707/803

(Continued)

FOREIGN PATENT DOCUMENTS

WO   WO 2009/0148781   12/2009

OTHER PUBLICATIONS

Wei, Pan; "Composite Social Network for Predicting Mobile Apps Installation", MIT Media Lab, dated Jun. 2, 2011. (Year: 2011).*

(Continued)

*Primary Examiner* — Mark A Fadok
(74) *Attorney, Agent, or Firm* — McDermott Will & Emery LLP

(57) ABSTRACT

An online application store may include an interface that provides collections to users of the application store. In one implementation, a webpage may be provided that presents, to a user of the online application store, a number of applications that are available, to the client, as applications for installation. The webpage may provide a visual interface that includes a first section that includes graphical representations of at least some of the applications; and a second section that provides an identification of one or more collections that each correspond to a subset of the applications. The one or more collections may include: a first collection that was created or edited by the user; and a second collection that was created or edited by one or more other users, the second collection being selected for the webpage, from a number of collections that were created or edited by the one or more other users, based on a ranking score that is determined at least based on a number of times that the subset of the applications, corresponding to the second collection, were installed.

20 Claims, 14 Drawing Sheets

(56) References Cited

U.S. PATENT DOCUMENTS

| | | | | |
|---|---|---|---|---|
| 7,827,259 | B2* | 11/2010 | Heller | G06F 17/30029 709/203 |
| 7,831,605 | B2* | 11/2010 | Plastina | G09B 5/06 707/758 |
| 8,346,798 | B2* | 1/2013 | Spiegelman | G06F 17/30766 707/770 |
| 8,768,788 | B2* | 7/2014 | Jones | G06Q 30/0207 705/26.41 |
| 8,880,599 | B2* | 11/2014 | Svendsen | H04L 29/08729 709/204 |
| 8,918,480 | B2* | 12/2014 | Qureshey | G06F 17/30749 379/101.01 |
| 9,049,259 | B2* | 6/2015 | Rathod | H04N 21/44222 |
| 9,191,229 | B2* | 11/2015 | Petersen | H04L 12/2809 |
| 9,208,239 | B2* | 12/2015 | Amidon | G06F 17/3087 |
| 9,473,825 | B2* | 10/2016 | Gossweiler, III | H04N 21/235 |
| 9,496,003 | B2* | 11/2016 | Gates | G06F 17/30053 |
| 2005/0240494 | A1* | 10/2005 | Cue | G06Q 10/107 705/26.1 |
| 2005/0240661 | A1* | 10/2005 | Heller | G06F 17/30029 709/219 |
| 2006/0195479 | A1* | 8/2006 | Spiegelman | G06F 17/30766 |
| 2006/0195516 | A1* | 8/2006 | Beaupre | G06F 17/30766 709/203 |
| 2006/0195521 | A1* | 8/2006 | New | G06F 17/30766 709/204 |
| 2007/0048712 | A1* | 3/2007 | Plastina | G09B 5/06 434/308 |
| 2008/0015952 | A1* | 1/2008 | Medved | G06Q 30/06 705/26.43 |
| 2008/0034317 | A1* | 2/2008 | Fard | G06F 3/0481 715/781 |
| 2008/0082565 | A1 | 4/2008 | Chang et al. | |
| 2008/0091549 | A1 | 4/2008 | Chang et al. | |
| 2009/0307682 | A1 | 12/2009 | Gharabally et al. | |
| 2010/0094935 | A1* | 4/2010 | Svendsen | H04L 29/08729 709/204 |
| 2011/0202848 | A1* | 8/2011 | Ismalon | G06F 17/3089 715/738 |
| 2012/0066602 | A1* | 3/2012 | Chai | G06F 3/04817 715/733 |
| 2012/0072312 | A1 | 3/2012 | Lange et al. | |
| 2012/0113964 | A1* | 5/2012 | Petersen | H04L 12/2809 370/338 |
| 2012/0316955 | A1* | 12/2012 | Panguluri | G06Q 30/02 705/14.41 |
| 2013/0212498 | A1* | 8/2013 | Lim | G06F 17/30905 715/760 |
| 2013/0326583 | A1* | 12/2013 | Freihold | G06F 3/04815 726/3 |
| 2015/0193108 | A1* | 7/2015 | Li | G06F 3/0486 715/748 |

OTHER PUBLICATIONS

International Search Report and Written Opinion issued for International Application No. PCT/RU2012/000442, dated May 15, 2013, 15 pages.

* cited by examiner

| COLLECTION TITLE | USER | APPLICATIONS | RANK |
|---|---|---|---|
| ADDICTING GAMES | SMITH | <APP_LIST> | 10 |
| ADDICTING GAMES | JONES | <APP_LIST> | 5 |
| ⋮ | ⋮ | ⋮ | ⋮ |

FIG. 4

USER CURATED COLLECTIONS FOR AN ONLINE APPLICATION ENVIRONMENT

BACKGROUND

An online application store may provide an interface, such as an interface provided through a web browser, in which users may view, manage, and download software applications. Typically, an application store may include applications designed to work with a particular hardware or software environment. For example, an application store may feature applications designed for web browsers or applications designed for a particular mobile operating system.

An online application store may provide a number of options for users that wish to browse applications. For example, a user may browse applications by category, view user-generated reviews that relate to applications, or search for applications. Some online application stores may provide collections of applications, where a collection may refer to a number of applications that are associated with a particular theme or label. For example, a collection may include an "editor's pick" collection or an "addictive games" collection. Collections, when provided by an application store, may provide convenient lists of applications that help to engage users that are browsing the application store.

SUMMARY

In one implementation, a method may include providing a webpage that presents, to a user of an online application store, applications that are available as applications for installation. The webpage may provide a visual interface that includes a first section that includes graphical representations of at least some of the applications and a second section that provides an identification of one or more collections that each correspond to a subset of the applications. The one or more collections may include a first collection that was created or edited by one or more other users, the first collection being selected for the webpage, from a number of collections that were created or edited by the one or more other users, based on a ranking score that is determined at least based on a number of times that the subset of the applications, corresponding to the second collection, were installed. The method may further include receiving selection, by the user, of the one or more collections; and providing, based on the selection, an indication of the applications that are included in the selected collection, the indication being provided in the first section of the visual interface.

In another implementation, one or more computing devices may include a memory to store instructions and one or more processors, to execute the instructions. The instructions may be executed to provide to a client, a webpage that presents, to a user of an online application store provided by one or more computing devices, a number of applications that are available, to the client, as applications for installation. The webpage may provide a visual interface that includes a first section that includes graphical representations of at least some of the plurality of applications and a second section that provides an identification of one or more collections that each correspond to a subset of the applications. The one or more collections may include a first collection that was created or edited by the user, and a second collection that was created or edited by one or more other users, the second collection being selected for the webpage, from a number of collections that were created or edited by the one or more other users, based on a ranking score that is determined at least based on a number of times that the subset of the applications, corresponding to the second collection, were installed. Additionally, the instructions may be further executed to receive selection, by the user, of the one or more collections; and provide based on the selection, an indication of the applications that are included in the selected collection, the indication being provided in the first section of the visual interface.

In another possible implementation, a computer-readable medium may include one or more instructions, which when executed by one or more processors of a computing device, cause the one or more processors to provide applications that are available, to a client, as applications for installation from an online application store, the applications being visually represented as graphical tiles arranged in a grid. The computer-readable medium may further include one or more instructions, which when executed by the one or more processors of the computing device, cause the one or more processors to provide, one or more collections, each corresponding to a subset of the applications, the one or more collections being provided as graphical tiles arranged in the grid and at least some of the one or more collections including collections that were generated by users of the online application store. The computer-readable medium may further include one or more instructions, which when executed by the one or more processors of the computing device, cause the one or more processors to receive, based on a drag and drop operation, an indication that one of the applications is to be added to one of the collections; and one or more instructions, which when executed by the one or more processors of the computing device, cause the one or more processors to transmit, to the online application store, the indication that the one of the plurality of applications is to be added to the one of the collections.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 4 is a diagram illustrating an example data structure that relates to collections maintained by an application store;

DETAILED DESCRIPTION

The following detailed description refers to the accompanying drawings. The same reference numbers in different drawings may identify the same or similar elements.

Overview

Consistent with aspects described herein, an online application store, more succinctly referred to as an application store herein, may include an interface that provides collections to users of the application store. At least some of the collections may be user curated. For example, users may create, modify, and share collections of applications. The collections may be browsed through a graphical interface that visually presents collections using graphical tiles.

Figure 1:
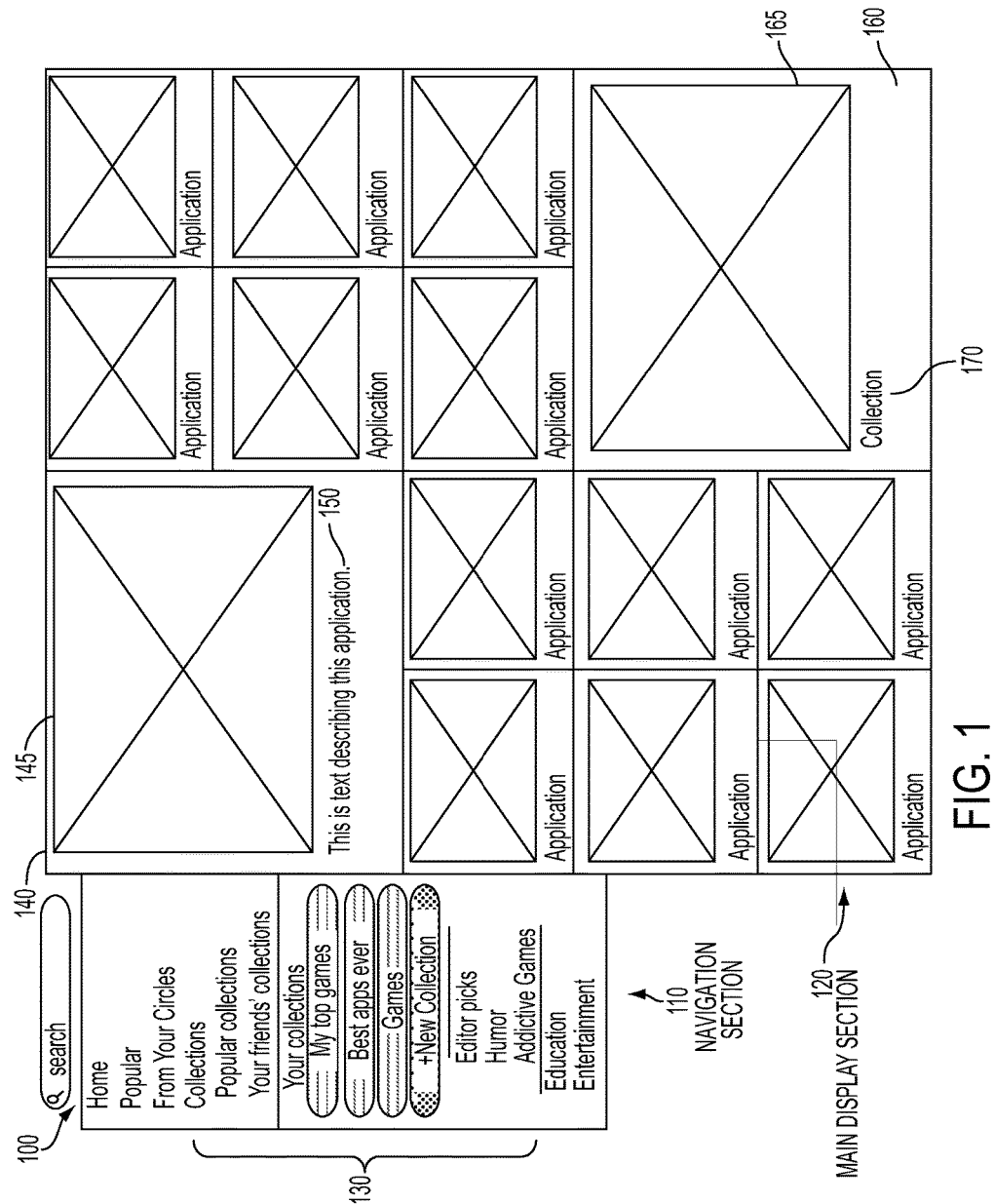
FIG. 1 is a diagram illustrating an overview of an interface provided by an application store.

FIG. 1 is a diagram illustrating an overview of an interface 100 provided by an application store. Interface 100 may include, for example, a graphical interface provided by a web browser, such as a webpage displayed by a web browser. Interface 100 may include a navigation section 110 and a main display section 120. Navigation section 110 may include a number of menu selections relating to browsing, editing, and/or managing collections. For example, as shown, a number of menu selections 130 may relate to collections. A user may select "popular collections" to view collections that are popular in the application store. Popularity of a collection may be based on, for example, collections that are most frequently viewed, collections from which applications are frequently installed, and/or based on other potential metrics of popularity. Another one of menu selections 130 ("Your friends' collections") may, when selected, result in the display of collections that were created or edited by friends of the user. The friends of a user may include, for example, other users that are associated with the user through an online social network service.

Menu selections 130 may include menu selections for other collections, such as "Your collections," which may correspond to collections that were created, edited, or otherwise associated with the user. In this example, the collections titled "my top games," "best apps ever," and "games" are illustrated. Menu selections 130 may also include a menu item to create a new collection, such as the menu item "+ New Collection."

Menu selections 130 may also include menu selections that present other collections, such as collections defined by an administrator or editor associated with the online application store. In this example, these other collections include the collections titled "editor picks," "humor," and "addictive games."

Selecting a collection in navigation section 110 may cause the contents of the collection to be displayed in main display section 120. As illustrated, main display section 120 includes a number of graphical tiles (e.g., graphical boxes or other graphical elements), each of which may represent an application or a collection, labeled in FIG. 1 as "application" or "collection" respectively. For example, each application or collection may be presented in a tile that includes an image and corresponding text. One of the applications, application 140, may be provided in a tile that includes an image 145 (represented by an X) and text 150. A collection 160 is also illustrated as provided in a tile that includes an image 165 and text 170.

A collection, as this term is used herein, can refer to one or more applications, or other content items, that are associated with one another. A collection may be formed by, for example, a user of the application store, an editor or administrator of the application store, or through an automated process based on, for instance, an aggregation of a number of user-created collections. Frequently, a collection may include applications that are related based on a theme (e.g., "best action games," "my favorite productivity applications").

Collections may be described herein as being curated by users. A user, as described herein, may refer to an individual or to an entity, such as a business entity or other organization. A user curated collection may include, for example, a collection that is initially created or sponsored by a business. A community of individual users may assist in editing or aggregating the collection of the business entity.

System Overview

Figure 2:
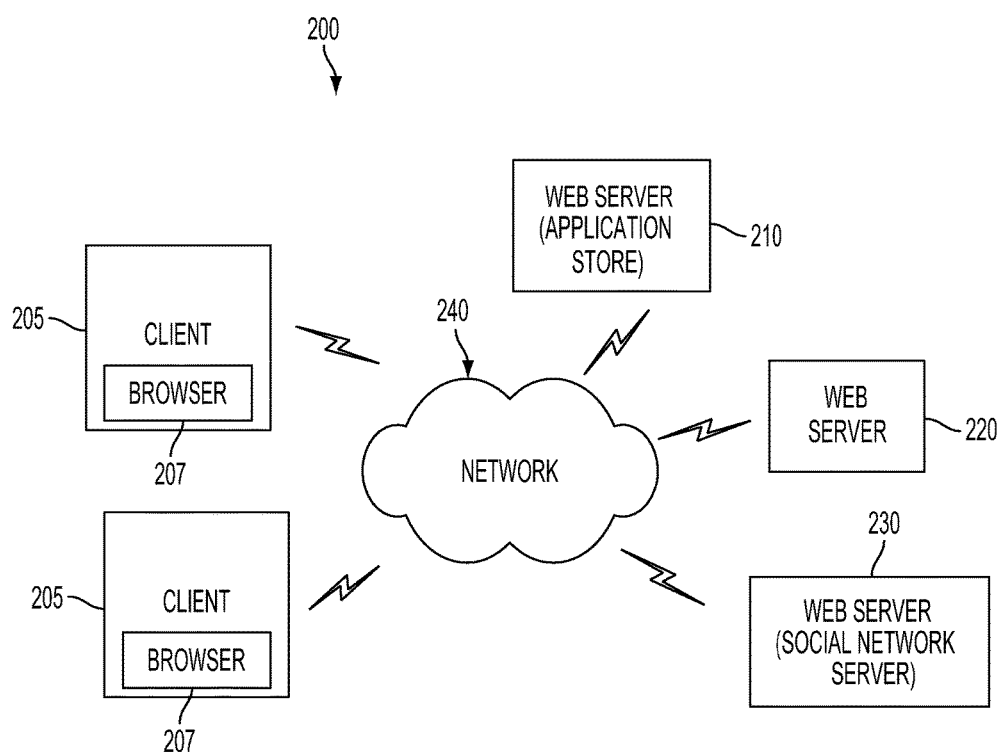
FIG. 2 is a diagram of an example environment in which techniques described herein may be implemented.

FIG. 2 is a diagram of an example environment 200 in which techniques described herein may be implemented. Environment 200 may include multiple clients 205 connected to one or more servers 210-230 via a network 240. In some implementations, servers 210-230 may include a web server, an application server, or a combination of an application server and a web server, such as an application server that provides data and/or documents through a hypertext markup language (HTML) interface. Clients 205 and servers 210-230 may connect to network 240 via wired, wireless, or a combination of wired and wireless connections.

Two clients 205 and three servers 210-230 are illustrated as connected to network 240 for simplicity. In practice, there may be additional or fewer clients and servers. Also, in some instances, a client may perform one or more functions of a server and a server may perform one or more functions of a client.

Clients 205 may include devices of users that access servers 210-230. A client 205 may include, for instance, a personal computer, a wireless telephone, a personal digital assistant (PDA), a laptop, a smartphone, a tablet computer, or another type of network device.

Servers 210-230 may include devices that access, fetch, aggregate, process, search, provide, and/or maintain documents. Although shown as single devices in FIG. 2, each server 210-230 may, in some implementations, be implemented as multiple computing devices, which potentially may be geographically distributed. While servers 210-230 are shown as separate entities, it may be possible for one of servers 210-230 to perform one or more of the functions of the other one of servers 210-230.

In the illustrated example, server 210 is particularly shown as a web server that implements an online application store. Server 210 may also be referred to herein as application store 210. Application store 210 may, for example, provide an interface through which users may browse, download, purchase, and/or install applications. The applications may include, for example, browser-based applications that are intended for browsers or applications designed for mobile devices (or tablet computers) that implement particular mobile operating systems. In some implementations, application store 210 may include content other than applications. For example, application store 210 may allow users to view and download music, electronic books, movies, videos, and/or other content.

As is further illustrated in FIG. 2, server 230 is shown as a web server that implements a social network (SOCIAL NETWORK SERVER). Server 230 may, for example, provide an interface through which users may interact with other users in a social network. A social network may generally be defined as a social structure made up of a set of users and the ties between the users (such as relationships, connections, or interactions). A user in a social network may typically be able to control which other users are directly connected to the user in the social network.

Network 240 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks.

Although FIG. 2 shows example components of environment 200, in other implementations, environment 200 may contain fewer components, different components, differently arranged components, and/or additional components than those depicted in FIG. 2. Alternatively, or additionally, one or more components of environment 200 may perform one or more other tasks described as being performed by one or more other components of environment 200.

Figure 3:
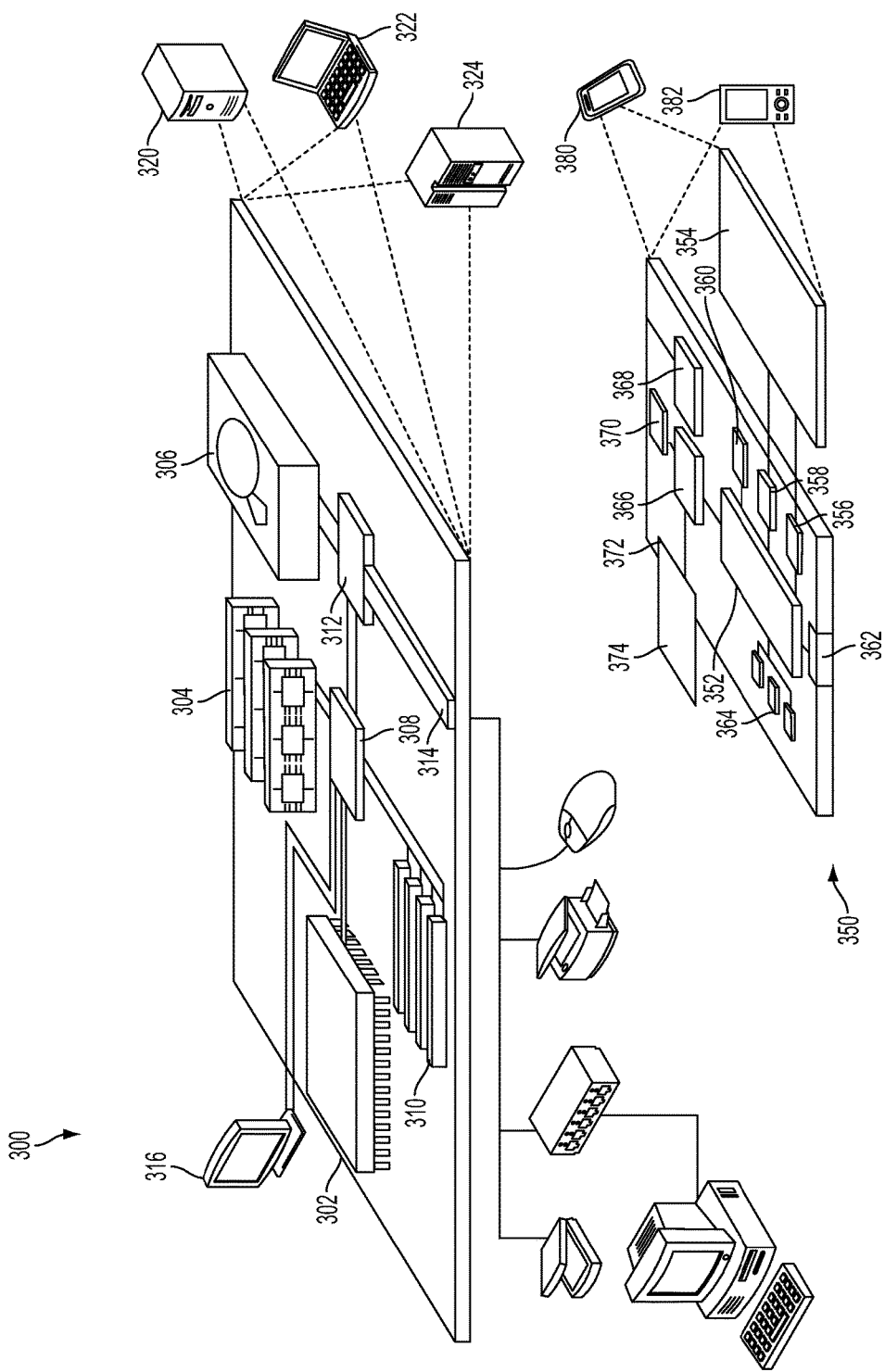
FIG. 3 shows an example of a generic computing device and a generic mobile computing device which may be used with the techniques described herein.

FIG. 3 shows an example of a generic computing device 300 and a generic mobile computing device 350, which may be used with the techniques described herein. Computing device 300 may correspond to, for example, a client 205 and/or server 210-230. For example, each of clients 205 and servers 210-230 may include one or more computing devices 300. Mobile computing device 350 may correspond to, for example, portable implementations of clients 205.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, may be interconnected using various busses, and may be mounted on a common motherboard or in other manners as appropriate. Processor 302 may process instructions for execution within computing device 300, including instructions stored in the memory 304 or on storage device 306 to display graphical information for a graphical user interface (GUI) on an external input/output device, such as display 316 coupled to high speed interface 308. In another implementation, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system, etc.

Memory 304 may store information within computing device 300. In one implementation, memory 304 may include a volatile memory unit or units. In another implementation, memory 304 may include a non-volatile memory unit or units. Memory 304 may also be another form of computer-readable medium, such as a magnetic or optical disk. A computer-readable medium may be defined as a non-transitory memory device. A memory device may include memory space within a single physical memory device or spread across multiple physical memory devices.

Storage device 306 may provide mass storage for computing device 300. In one implementation, storage device 306 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 304, storage device 306, or memory included within processor 302.

High speed controller 308 may manage bandwidth-intensive operations for computing device 300, while low speed controller 312 may manage lower bandwidth-intensive operations. Such allocation of functions is an example only. In one implementation, high-speed controller 308 may be coupled to memory 304, display 316, e.g., through a graphics processor or accelerator, and to high-speed expansion ports 310, which may accept various expansion cards (not shown). In the implementation, low-speed controller 312 may be coupled to storage device 306 and to low-speed expansion port 314. Low-speed expansion port 314, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

Computing device 300 may be implemented in a number of different forms, as shown in FIG. 3. For example, it may be implemented as a standard server 320, or multiple times in a group of such servers. It may also be implemented as part of a rack server system 324. Additionally or alternatively, computing device 300 may be implemented in a personal computer, such as a laptop computer 322. Additionally or alternatively, components from computing device 300 may be combined with other components in a mobile device (not shown), such as mobile computing device 350. Each of such devices may contain one or more of computing device 300, mobile computing device 350, and/or an entire system may be made up of multiple computing devices 300 and/or mobile computing devices 350 communicating with each other.

Mobile computing device 350 may include a processor 352, a memory 364, an input/output (I/O) device such as a display 354, a communication interface 366, and a transceiver 368, among other components. Mobile computing device 350 may also be provided with a storage device, such as a micro-drive or other device (not shown), to provide additional storage. Each of components 350, 352, 364, 354, 366, and 368, may be interconnected using various buses, and several of the components may be mounted on a common motherboard or in other manners as appropriate.

Processor 352 may execute instructions within mobile computing device 350, including instructions stored in memory 364. Processor 352 may be implemented as a set of chips that may include separate and multiple analog and/or digital processors. Processor 352 may provide, for example, for coordination of the other components of mobile computing device 350, such as, for example, control of user interfaces, applications run by mobile computing device 350, and/or wireless communication by mobile computing device 350.

Processor 352 may communicate with a user through control interface 358 and a display interface 356 coupled to a display 354. Display 354 may include, for example, a TFT LCD (Thin-Film-Transistor Liquid Crystal Display), an OLED (Organic Light Emitting Diode) display, and/or other appropriate display technology. Display interface 356 may comprise appropriate circuitry for driving display 354 to present graphical and other information to a user. Control interface 358 may receive commands from a user and convert them for submission to processor 352. In addition, an external interface 362 may be in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 may store information within mobile computing device 350. Memory 364 can be implemented as one or more of a computer-readable medium or media, a volatile memory unit or units, or a non-volatile memory unit or units. Expansion memory 374 may also be provided and connected to mobile communication device 350 through expansion interface 372, which may include, for example, a SIMM (Single In Line Memory Module) card interface. Such expansion memory 374 may provide extra storage space for mobile computing device 350, or may also store applications or other information for mobile computing device 350. Specifically, expansion memory 374 may include instructions to carry out or supplement the processes described above, and may also include secure information. Thus, for example, expansion memory 374 may be provided as a security module for mobile computing device 350, and may be programmed with instructions that permit secure use of mobile computing device 350. In addition, secure applications may be provided via SIMM cards, along with additional information, such as placing identifying information on a SIMM card in a non-hackable manner.

Memory 364 and/or expansion memory 374 may include, for example, flash memory and/or NVRAM memory, as discussed below. In one implementation, a computer program product may be tangibly embodied in an information carrier. The computer program product may store instructions that, when executed, perform one or more methods, such as those described herein. The information carrier may correspond to a computer- or machine-readable medium, such as the memory 364, expansion memory 374, or memory included within processor 352, that may be received, for example, over transceiver 368 or over external interface 362.

Mobile computing device 350 may communicate wirelessly through a communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, a Global Positioning System (GPS) receiver module 370 may provide additional navigation- and location-related wireless data to mobile computing device 350, which may be used as appropriate by applications running on mobile computing device 350.

Mobile computing device 350 may also communicate audibly using an audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in FIG. 3. For example, it may be implemented as a cellular telephone 380. It may also be implemented as part of a smart phone 382, a personal digital assistant (not shown), and/or other similar mobile device.

Various implementations of the systems and techniques described herein may be realized in digital electronic circuitry, integrated circuitry, specially designed application specific integrated circuits (ASICs), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and may be implemented in a high-level procedural and/or object-oriented programming language, and/or in assembly/machine language. As used herein, the terms "machine-readable medium" and "computer-readable medium" may refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the systems may be interconnected by any form or medium of digital data communication (e.g., a communication network). Examples of communication networks include a local area network ("LAN"), a wide area network ("WAN"), and the Internet.

Although FIG. 3 shows example components of computing device 300 and mobile computing device 350, computing device 300 and/or mobile computing device 350 may include fewer components, different components, additional components, or differently arranged components than depicted in FIG. 3. Additionally or alternatively, one or more components of computing device 300 or mobile computing device 350 may perform one or more tasks described as being performed by one or more other components of computing device 300 or mobile computing device 350.

User Curated Collections

Application store 210 may include numerous applications. Discovery of new and useful applications, for a particular user, can be difficult. Consistent with concepts described herein, application store 210 may provide interfaces through which users can create and manage collections of applications. Collections may be shared with other users in the application store, such as other users that are connected, to the user that created a collection, via a social network.

In some implementations, collections may be ranked and high ranking and/or popular collections may be provided to users. Additionally, in some implementations, similar collections may be aggregated to obtain aggregated collections that may be provided to users.

Users may interact with application store 210 through one or more interfaces, such as a webpage, that is provided to clients 205. The interfaces may present applications and collections, for application store 210, as graphical tiles. Collections may be created, edited, modified, and shared using drag and drop actions applied to the tiles.

FIG. 4 is a diagram illustrating an example data structure 400 that relates to collections maintained by application store 210. Data structure 400 may be stored and/or maintained by application store 210.

Data structure 400 may include a number of fields, illustrated as collection title field 410, user field 420, applications field 430, and rank field 440. Collection title field 410 may include the label or name of a collection in application store 210. For user created collections, the title of the collection may be entered by the user during the creation process. User field 420 may include identification of the user that created the collection or the user that is otherwise assigned to the collection. Applications field 430 may include a list of the applications that are in the corresponding collection. Ranking field 440 may include one or more scores that provide an indication of the quality or popularity of the corresponding collection.

A number of techniques may be used to generate the scores associated with ranking field 440. For example, application store 210 may determine the ranking scores based on one or more signals that may relate to the quality or popularity of collections or to the quality or popularity of applications that are contained within a collection.

In some implementations, the signals may include the total or average number of installations of the applications in the collection. Alternatively or additionally, the score for a collection may be based on explicit evaluations from users, such as by asking users to rate a collection on a scale having a predetermined range (e.g., between zero (a low quality collection) and five (a high quality collection)).

Other signals may alternatively or additionally be used to generate or influence the score for a collection. For example, information relating to the user that created the collection may be used to influence the score for the collection. For instance, a user that has created a large number of other collections or a user that is considered influential based on an analysis of the connections of the user in a social network, may have the score, of the collections created by the user, modified.

In some implementations, the scores may be calculated on a per-user basis. Alternatively or additionally, the scores, stored in ranking field 440, may be modified to obtain a final ranking for each user. For example, connections in a user's social network may be used to obtain a ranking score that measures the relevance of a collection to the user. For instance, a collection that contains applications that are installed by a relatively large number of people in the user's social network may be given a higher score than a collection that contains applications that tend to not be used or installed by people in the user's social network.

For browser-based applications, signals relating to browser-specific information may be used to determine the scores for applications. For example, user browsing history or bookmarks may be used, with user permission, to determine user interactions with a website corresponding to installed applications. As another example, permissions relating to an application, such as permissions relating to browser resources that may be accessed by the application, may be used in determining the scores.

Data structure 400 represents an example data structure that may be stored and/or used by application store 210. In other possible implementations, data structure 400 may include fewer fields, different fields, or additional fields than those shown in FIG. 4.

Figure 5:
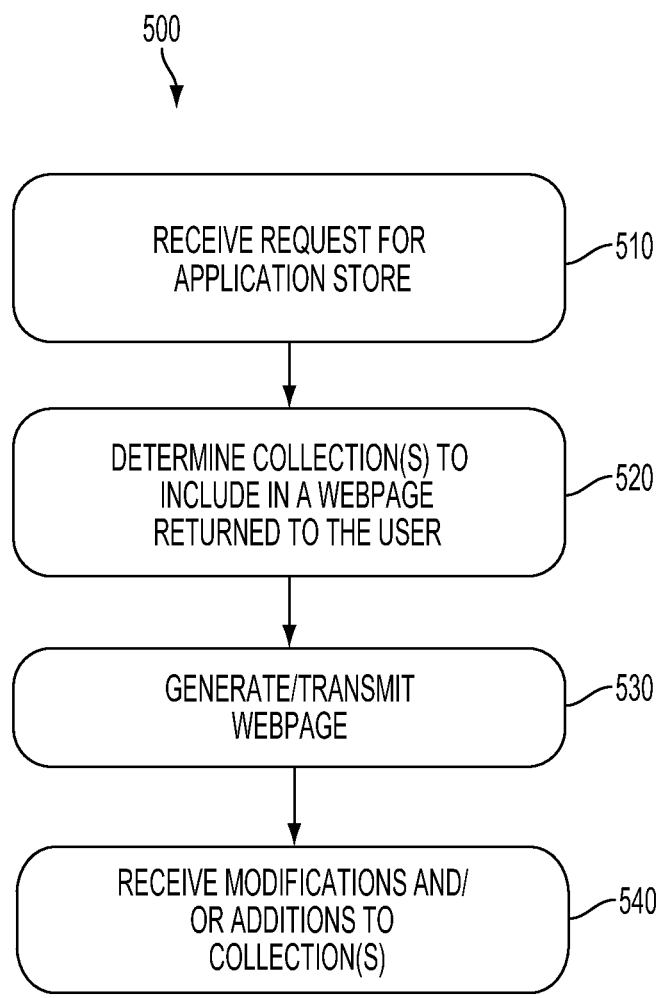
FIG. 5 is a flowchart illustrating an example process relating to the interface provided by an application store.

FIG. 5 is a flowchart illustrating an example process 500 relating to the interface provided by application store 210. Process 500 may be performed by, for example, application store 210.

Process 500 may include receiving a request to view an interface for application store 210 (block 510). In some implementations, the request may be for a webpage, such as a hypertext transfer protocol (HTTP) request, that provides the interface. In other possible implementations, the interface may be provided in another manner. For clarity, in the description herein, application store 210 will be described as providing a graphical interface to a user via an HTML document that is presented in a browser 207. In one implementation, other technologies may be used to provide the interface.

Process 500 may further include determining the collection(s) to include in a webpage returned to the user (block 520). The collections may be included as, for example, a list of one or more titles corresponding to the collections, such as the collections shown in navigation section 110 of FIG. 1. In some implementations, the collections to include may be based on the scores determined for the collections. For example, based on the scores, the highest quality and/or most popular collections may be determined and a certain number of these collections may be included in the interface returned to the user. In some implementations, and as previously mentioned, the relevance of the collection to a particular user may be determined based on the scores of the collections and based on other information that is specific to the user, such as links in the social network of the user or based on the type of applications that have been previously installed by the user.

In some implementations, certain collections may be presented to all users regardless of the score. For example, collections created by administrators of application store 210 or collections created by the user may always be provided in the interface returned to the user.

Process 500 may further include generating and/or transmitting the webpage to the user (block 530). As mentioned, the webpage may provide an interface for application store 210. As will be discussed in more detail below, the collections, provided in the interface, may be visually presented as tiles or as graphical representations of the collections. Other information, such as representations of applications available in the application store, may also be provided in the webpage.

Process 500 may further include receiving modifications and/or additions to collections (block 540). The user may, for example, create a new collection, remove a collection, and/or add or remove applications associated with an existing collection. Techniques for removing, modifying and/or adding collections, in the context of a graphical interface presented by application store 210, will be discussed in more detail below.

As previously mentioned, the scores, corresponding to collections, may be determined, based on a number of possible signals. One example technique for determining scores for collections of browser applications, also called browser extensions, will next be discussed. A browser application may be an application that is installed as an add-on, extension, theme, or other software that adds additional functionality to a web browser. In one implementation, a browser application may include an application written using HTML, cascading style sheets (CSS), and/or JavaScript. In some implementations, applications other than browser applications, such as native applications for a computing device, may instead be used as the basis for the collections.

Figure 6:
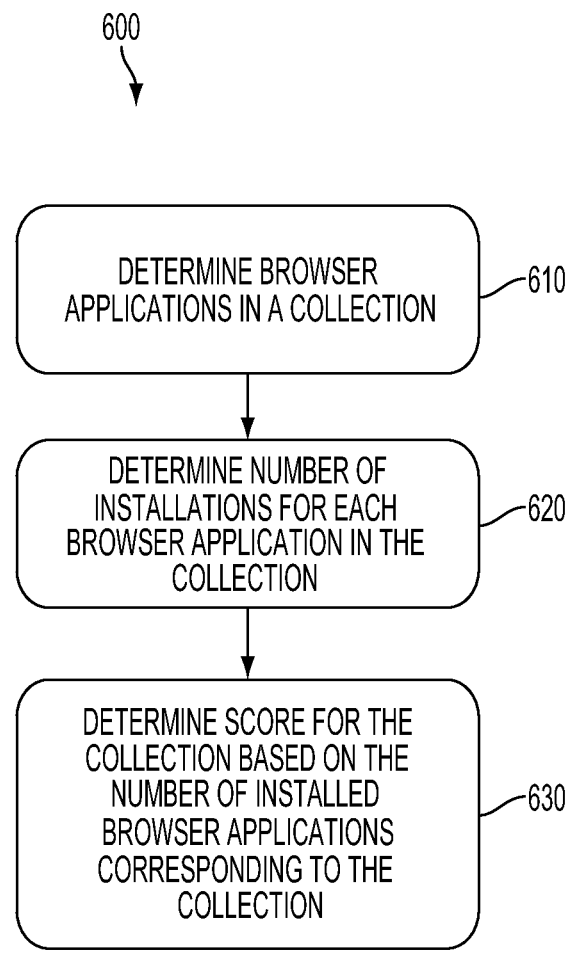
FIG. 6 is a flowchart illustrating an example process for determining a score for a collection.

FIG. 6 is a flowchart illustrating an example process 600 for determining a score for a collection. Process 600 may be performed, for example, by application store 210.

Process 600 may include determining the browser applications that are included in the collection (block 610). As mentioned, the applications that are included in a collection may be stored by application store 210, such as in applications fields 430 of data structure 400.

Process 600 may further include determining the number of installations for each browser application in the collection (block 620). For browser applications, applications may be directly installed from application store 210, and hence application store 210 may be able to directly track the installations of the browser applications. The number of installations of a browser application may act as a proxy for the popularity of the browser application. In some implementations, the number of downloads of a browser application may be used in place of the number of installations. In some implementations, the number of installations may be limited to a particular period, such as a particular N (N>=1) day period.

Process 600 may further include, based on the number of installations of browser applications in a collection, determining the score for the collection (block 630). In general, collections that correspond to a higher number of installed browser applications may be given a higher score. For example the score, for the collection, may be based on the sum or average of the number of installations, of browser applications corresponding to the collection.

Process 600 illustrates one technique for determining quality or popularity of a collection. In alternative or additional implementations, other techniques can be used to determine scores for collections. For example, signals other than the number of installed browser applications, may alternatively or additionally be used to calculate the score for a collection.

A number of features relating to the ability of users to interact with collections, such as through a webpage provided to the users at clients 205, will next be discussed with reference to FIGS. 7-13. FIGS. 7-13 illustrate example user interfaces that may be provided, such as through a browser 207, to users.

Figure 7:
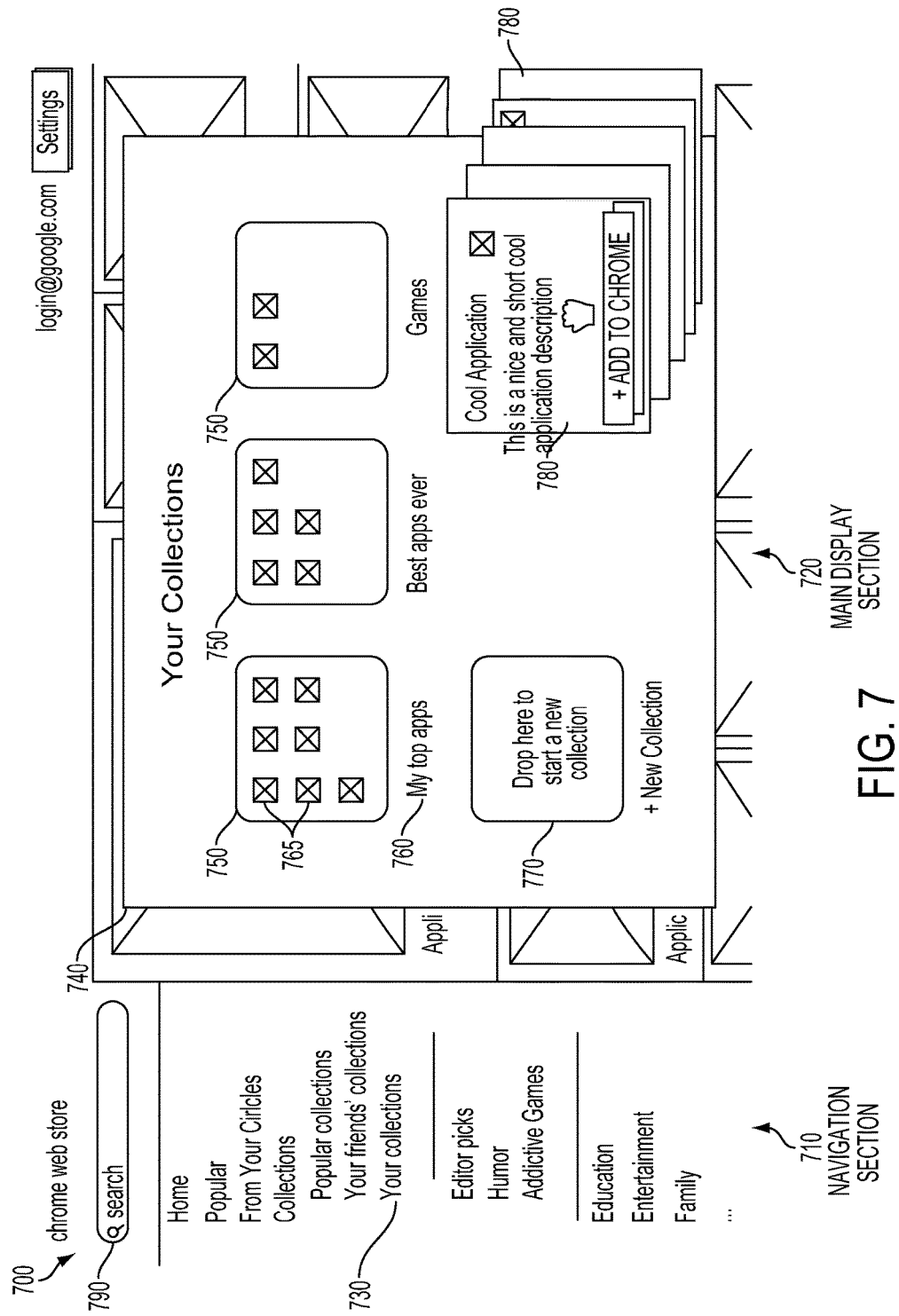
FIG. 7-9 are diagrams illustrating an example interfaces which may be presented by a browser.

FIG. 7 is a diagram illustrating an example interface 700, which may be presented via browser 207. Similar to interface 100, shown in FIG. 1, interface 700 may include a navigation section 710 and a main display section 720.

Interface 700 may represent an interface that is presented in response to a user selecting to view a set of collections. In this case, the user may have selected menu item 730 ("Your collections") from navigation section 710. In response, a window 740 may be presented in interface 700. Window 740 may display one or more of the collections 750 that have been created by the user. In this example, each collection is displayed in a graphical box that is shown associated with a title 760 for the collection. Each collection 750 may include images 765, such as icons or thumbnail images, that each represent an application in the collection. Selecting an image 765 may cause a more detailed view of the corresponding application to be displayed.

As is additionally shown in interface 700, a new collection 770, illustrated as a graphical box without any included applications, may provide for the creation of a new collection when selected by the user. Selecting new collection 770, or dragging an image corresponding to an application, from the background of window 740 and into new collection 770, may create a new collection. A user may provide a title for the new collection and populate the new collection by dragging tiles representing applications to new collection 770.

One application, application 780, is indicated as being dragged by a user, from the background of window 740, into window 740. The user may, for instance, place application 780 into new collection 770, to add application 780 to new collection 770.

Interface 700 may additionally include a search box, search box 790, into which a user may enter search queries. In response, application store 210 may provide applications, collections, or other items, that are relevant to the search query. The operation of search box 790 will be described in more detail below.

Figure 8:
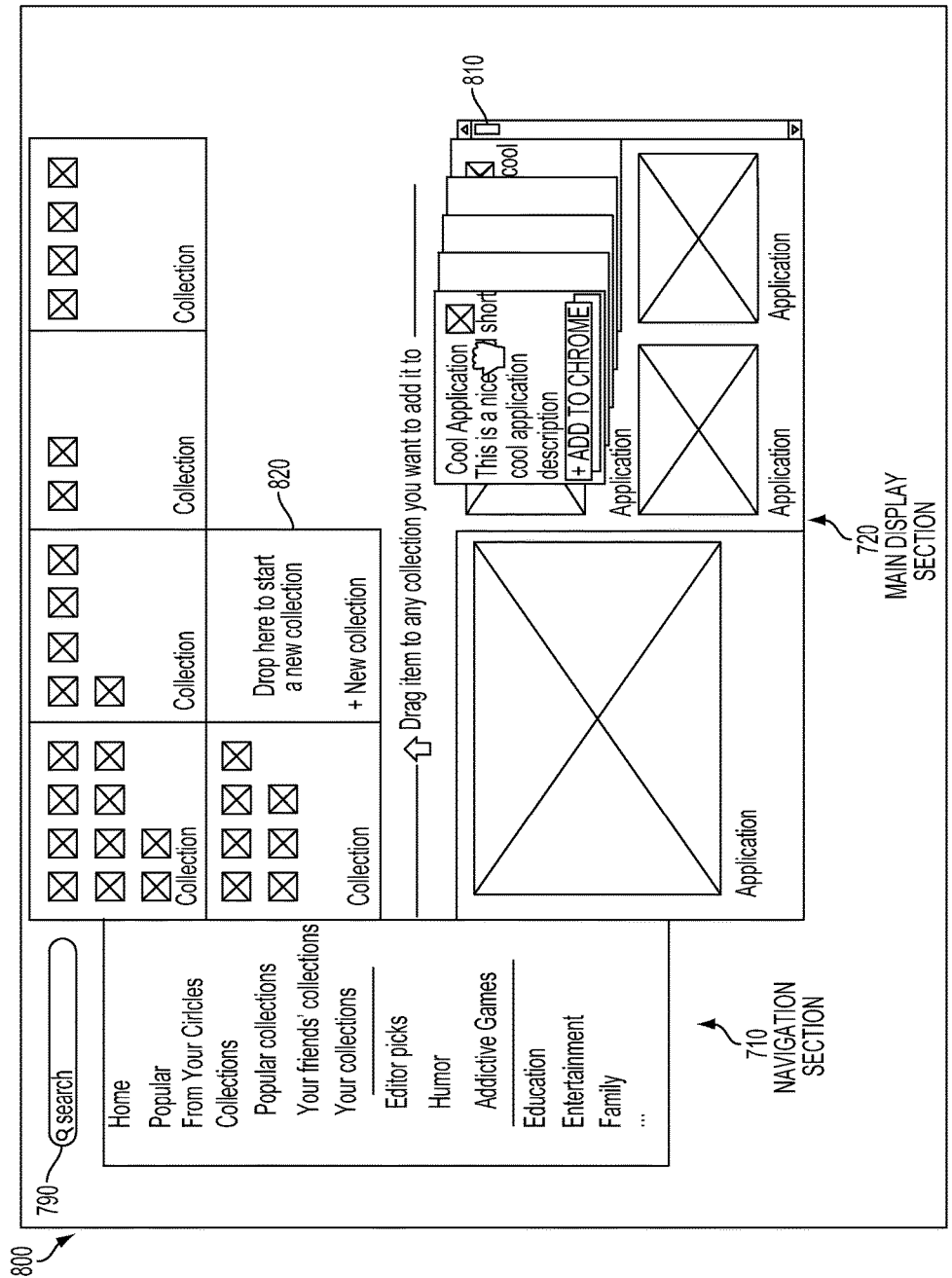

FIG. 8 is a diagram illustrating another example interface 800. Interface 800 may be similar to interface 700, such as a version of interface 700 that is presented in response to user interactions, such as user selection of the "collections" or "your collections" menu items.

As illustrated in FIG. 8, main display section 720 may be divided into a top portion, in which the user's collections are presented, and a bottom portion, in which applications are presented. Each of the collections and applications may be shown as a graphical tile that includes an image that represents the application or collection, and text that describes the application or collection. The top and bottom portions of main display section 720, in FIG. 8, may be independently searched or browsed. For example, a user may search for applications by entering a search terms into search box 790, search by category, or search in another manner. The results of the application search may be displayed in the bottom portion of main display section 720.

One application, application 810, is indicated as being dragged by a user, from the bottom portion of interface 800 to the top portion of interface 800. The user may, for instance, place ("drop") application 810 into one of the collections in the top portion, which may cause the application to be added to the corresponding collection. The top portion of interface 800 may also include a new collection tile 820. Dragging an application to new collection tile 820 may create a new collection. For example, a dialog may be presented for the user to enter the title of the new collection.

In FIGS. 7 and 8, applications may be added to collections in a relatively easy and intuitive manner, such as through the use of a drag and drop operation. A drag and drop operation, to add applications to collections, can be particularly useful as it does not require additional buttons in interfaces 700/800.

Applications and collections, as illustrated in FIGS. 7 and 8, are represented as graphical blocks or tiles that are draggable by the user. In some implementations, a tile may snap back to its original position if dragged less than a few pixels. Dragging and dropping a tile, that represents an application, into another location that contains application tiles, may cause the positioning of the tiles to correspondingly change. In some implementations, if a user drops a tile into an area that is not valid for a drop operation, a hint may be displayed that explains how the drag and drop operation works. In some implementations, tiles, representing applications, may also be dragged and dropped into the menu labels in navigation section 710. Different labels in navigation section 710 may be displayed differently when a label supports a drop operation with an application tile. For example, when a user is dragging a tile, labels that do not support a drop operation may be shown with a different visual representation (e.g., greyed out) relative to labels that do support a drop operation. Dragging a tile, representing an application, to a menu label, representing the title of a collection, may cause the application to be added to the collection. Similarly, in some implementations, menu labels may be dragged from navigation section 710 to applications to cause the application to be added to the collection corresponding to the menu label.

Figure 9:
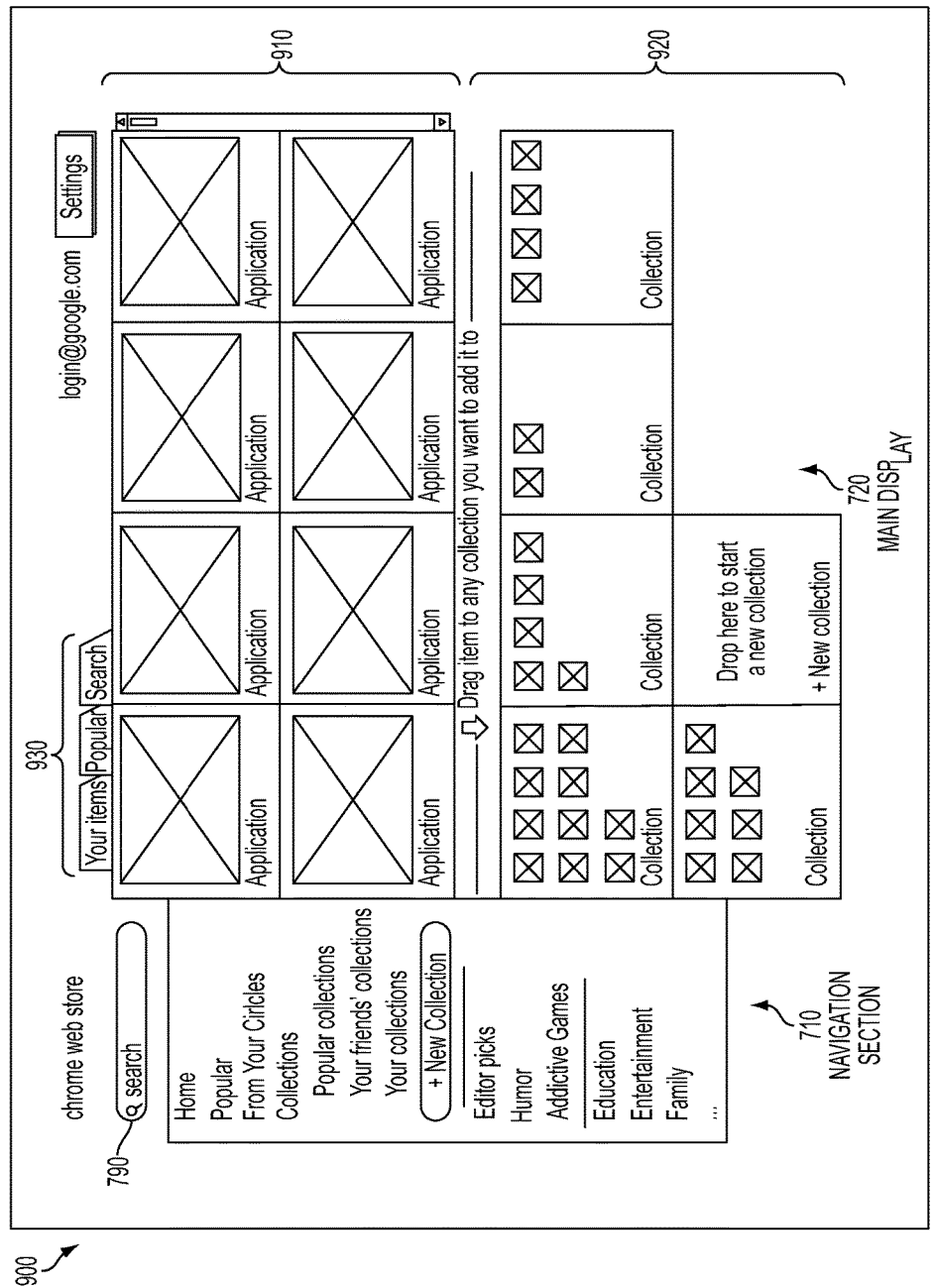

FIG. 9 is a diagram illustrating another example interface 900. Similar to interface 800, main display section 720 of interface 900 may be split into a top portion 910 and a bottom portion 920. Top portion 910 may present one or more applications and bottom portion 920 may present one or more collections. Users may drag and drop applications, from top portion 910, into a collection in bottom portion 920, to add the application to the collection.

Top portion 910 may also include tabs 930. Selection of different ones of tabs 930 may provide different groups of applications to be shown in top portion 910. The example tab labels of "Your items," "Popular," and "Search" are illustrated in FIG. 9. Selecting one of these labels may present the applications associated with the label. The "Search" tab, for example, may present the applications associated with the last time the user performed a search operation, or may present an interface for performing a search.

In one implementation, when a user selects a collection in bottom portion 920, the applications corresponding to the collection may be shown in top portion 910. Collections shown in bottom portion 920 may also include a method for users to delete applications from a collection. For example, in one implementation, each application may be shown as including an "X," (or other graphic representation) that when selected, may delete the application from the collection. In another possible implementation, a trash can or other deletion icon may be shown in bottom portion 920. A user may drag applications, from within a collection, to the deletion icon to delete the applications from the collection.

Through interface 900, a user may control the applications shown in top portion 910 in a number of ways, such as by selecting a collection in bottom portion 920, selecting a menu item from navigation section 710, or by performing a search using search box 790. Interface 900 Interface 900 may thus advantageously provide flexible choices through which a user may browse applications and edit collections.

In some implementations, interfaces, such as interfaces 700-900, may also provide user reviews, of collections or of applications with collections. For example, users may comment on or otherwise review a collection, and/or users may rate a collection (e.g., on a scale from one to five). The reviews and/or ratings may be provided to other users.

Figure 10A:
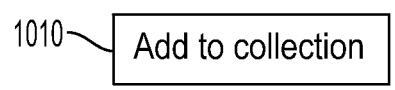
FIGS. 10A and 10B are diagrams illustrating an example graphical button that may assist a user in adding applications to a collection.
Figure 10B:

In some implementations, interfaces, such as interfaces 700-900, may include a button or other graphical representation that may assist a user in adding applications to a collection. FIGS. 10A and 10B are diagrams illustrating an example graphical button that may assist a user in adding applications to a collection.

In FIG. 10A, a button 1010 is shown as a relatively small button that may be, for example, superimposed on an application tile or at another location in one of interfaces 700-900. In one implementation, button 1010 may be visible when the user selects a tile corresponding to a particular application. When a user selects or hovers over button 1010, button 1010 may change its visible appearance to expand to include additional options for adding the selected application to the collection. An expanded version of button 1010 is shown in FIG. 10B as button 1020. As shown, button 1020 may include a list of collections 1025, such as the list of collections associated with the user, and a field 1030 to add a new collection. Through button 1020, a user may select a collection to which the application is to be added (such as the collection "best games ever") or create a new collection that includes the application. Buttons 1010/1020 may enable a user to add an application to a collection in a straightforward manner and without requiring the user to interact with interface elements (such as a menu option in navigation section 710) that may not be clearly associated with the application or without requiring the user to know that certain actions, such as drag and drop operations, may be used to edit collections.

When creating a new collection, users may be given the option to enter the title of the new collection. In some implementations, the available choices for the title of the new collection may be limited or titles may be suggested in a way that encourages users to select from a limited number of titles. For example, an autocomplete feature, applied to a box in which a user types in new titles, may encourage reuse of a certain number of titles. Limiting the number of collection titles may facilitate aggregation of collections, described in more detail below.

In some implementations, collections that have same or similar titles may be aggregated over a number of users. For example, an "addictive games" collection may be created and/or edited by a number of users. These collections may be aggregated in some manner, such as by combining the "addictive games" collections corresponding to all of the users that are connected to a particular user in a social network.

Figure 11A:
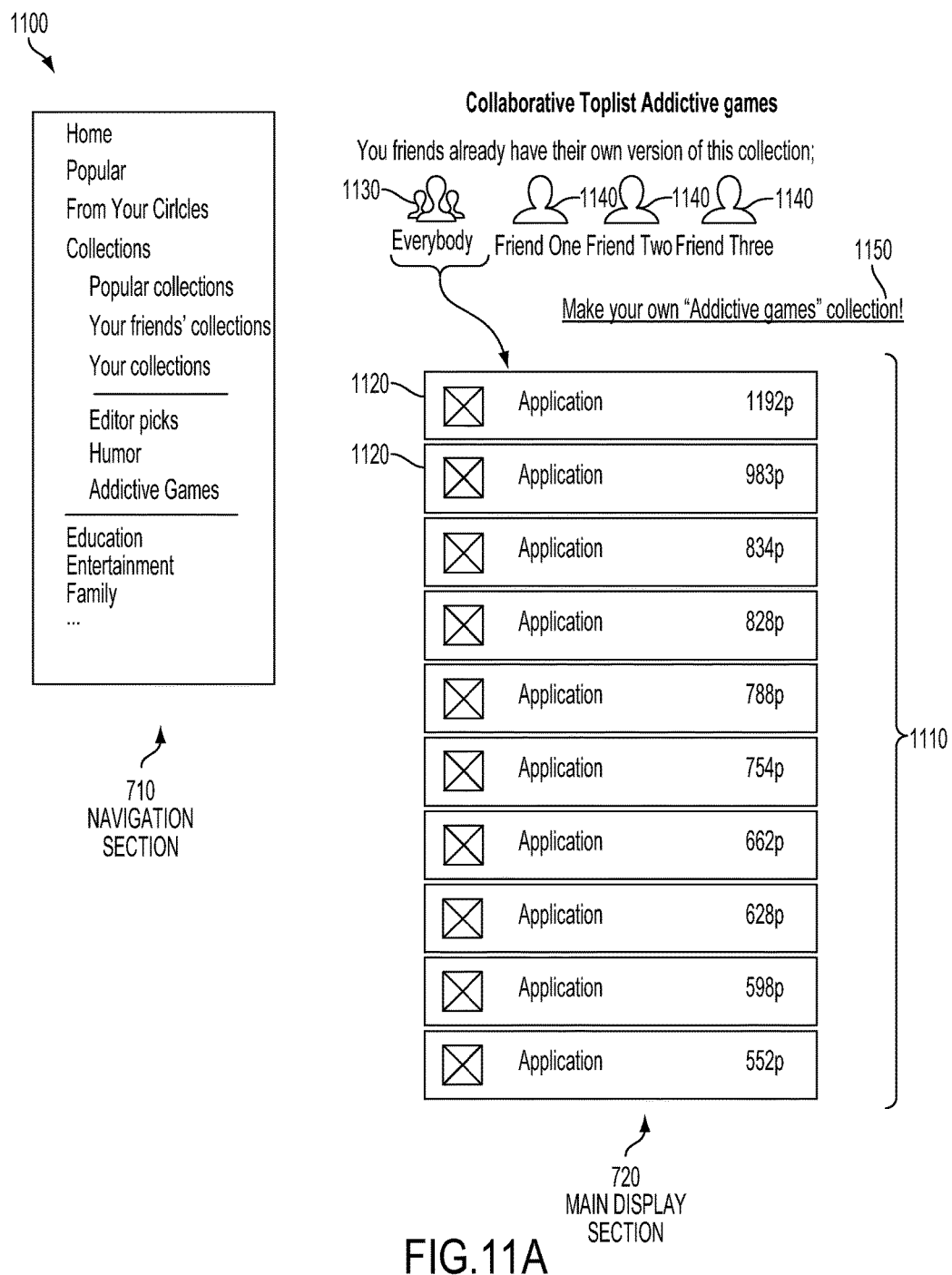
FIGS. 11A and 11B are diagrams illustrating example interfaces that may be used to provide aggregated collections to users.

FIG. 11A is a diagram illustrating an example interface 1100 that may be used to provide aggregated collections to users. Interface 1100 may include, in main display section 720, an aggregated collection 1110, which includes a number of applications 1120, represented by graphical tiles. In FIG. 11, an aggregated collection is referred to as a "collaborative toplist" and aggregated collection 1110 is titled "addictive games."

In one implementation, aggregated collection 1110 may be determined based on the collections, in application store 210, that are titled "addictive games." In some implementations, certain titles for collections may be encouraged, such as by suggesting collection titles to users or requiring users to choose, when creating a collection, from a predetermined set of possible collection titles. The applications that are included in an aggregated collection may be based on the union of the applications included in all of the collections having the particular title. In some implementations, the applications included in a particular aggregated collection may be additionally filtered. For example, only applications that occur in a threshold number of collections may be included in the aggregated collection or only applications that have a score above a threshold may be included in the aggregated collection. In some implementations, when displaying applications 1120 in aggregated collection 1110, applications 1120 may be sorted based on the scores of applications 1120, so that more popular and/or higher quality applications are more prominently presented. Values relating to the ranking or popularity may potentially be displayed in the tile for each application. In FIG. 11, for example, the first application in collection 1110 includes the value "1192p" and the second application in collection 1110 include the value "983p," which may, in FIG. 11, illustrate the number of other collections that include the corresponding application.

As is further shown in FIG. 11, interface 1100 may include options through which a user may display other versions of aggregate collection 1110. For instance, an option to display the "addictive games" collection for everyone (graphical icon 1130) and options to display the "addictive games" collection for various friends of the user (graphical icons 1140), such as determined by connections in a social network, are also provided in interface 1100. As illustrated, graphical icon 1130 may be selected, causing aggregate collection 1110 to be presented. Selection of one of icons 1140, corresponding to a particular friend of the user, may cause the "addictive games" collection, of the particular friend, to be presented.

Interface 1100 may also include a selectable option, such as link 1150, for the user to create a collection, such as a collection having the same title as the collection being viewed ("addictive games"). In response to selection of link 1150, an interface may be provided to the user through which the user may create a new collection that has same title as the collection being viewed.

Figure 11B:
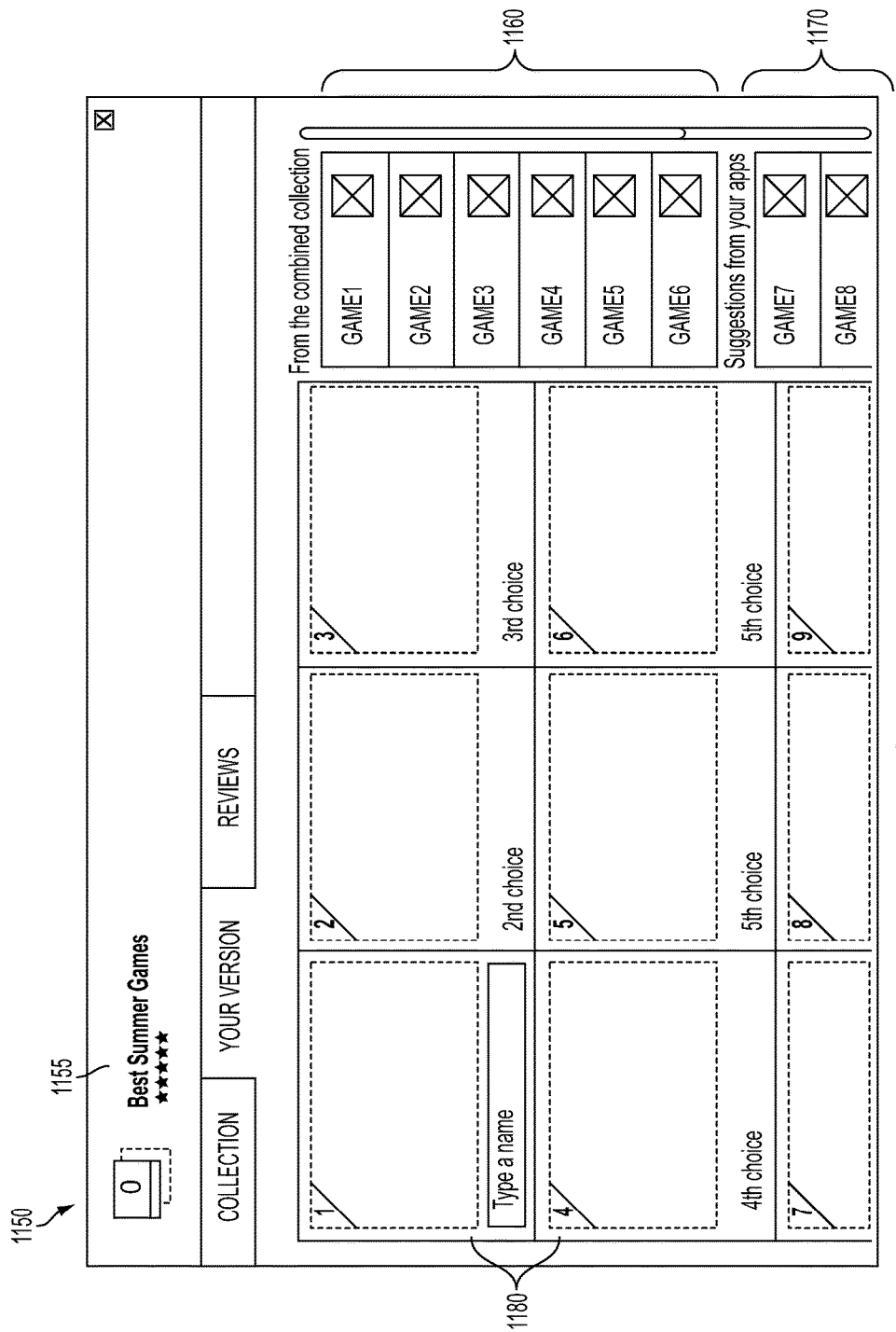

FIG. 11B is a diagram illustrating an example interface 1150 that may be used to provide aggregated collections to users. In interface 1150, an aggregate collection 1155 ("Best Summer Games") is illustrated. A user may be given the opportunity to customize aggregate collection 1155. A display section 1160 may present a number of applications, from aggregate collection 1155. A display section 1170 may present applications, that have been installed or otherwise used by the user. The user may drag applications from section 1160 or from section 1170, into blank tiles 1180, to add the selected applications to a custom version of collection 1155. In this manner, a user may create a custom version of an aggregate collection. The aggregate collection may be used as a starting point from which the user can create the custom aggregate collection.

Figure 12:
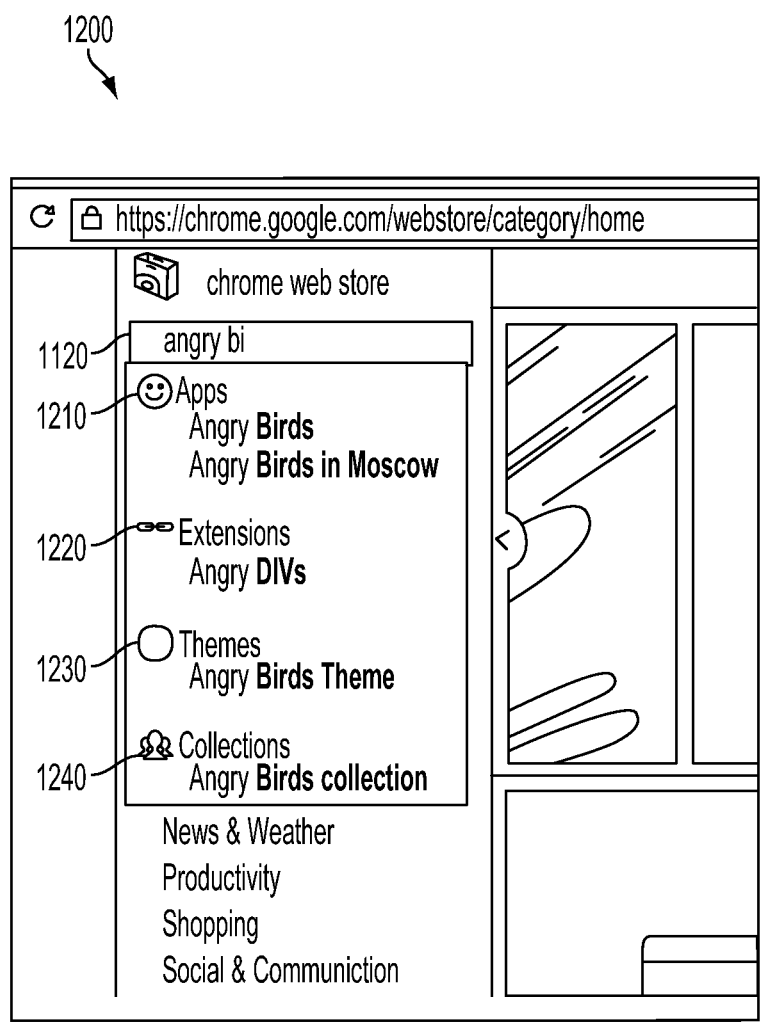
FIG. 12 is a diagram illustrating an example interface that may be provided in response to a user searching in a search box.

As previously discussed, with reference to FIG. 7, an interface of application store 210 may include a search box, such as search box 790, through which a user may search for items available through application store 210. FIG. 12 is a diagram illustrating an example interface 1200 that may be provided in response to a user searching in search box 790. As illustrated, results for a search may be provided as the user enters the search query and the results may be segmented into categories. A number of categories are shown in FIG. 12, including three categories for different types of web browser applications: applications 1210, extensions 1220, and themes 1230; and a category 1240 for collections that are relevant to the search query. By providing a collections category 1240 within search results provided in an interface of application store 210, users may be introduced to collections and may be more likely to create or edit collections.

In some implementations, each collection may be assigned a unique uniform resource locator (URL) by application store 210. Giving collections unique URLs may allow a user to interact with collections via direct navigation or through organic search.

Figure 13:
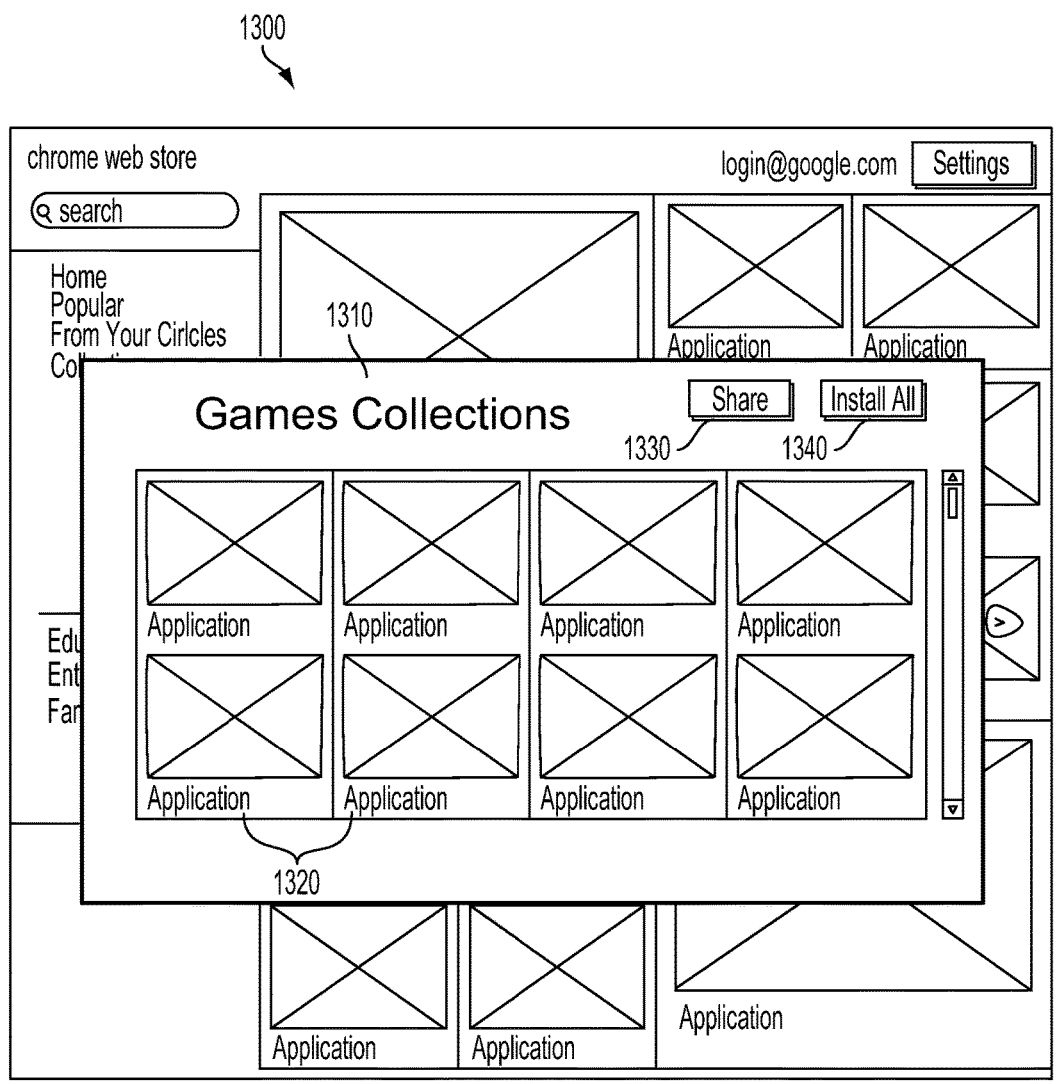
FIG. 13 is a diagram illustrating an example interface through which users can browse and share collections.

FIG. 13 is a diagram illustrating an example interface 1300 through which users can browse and share collections. Interface 1300 may represent, for example, an interface that provides a view of a particular collection. Interface 1300 may be accessed, for example, by selecting a collection title from navigation section 710.

As shown in interface 1300, a collection 1310 may be displayed such that applications in the collection are displayed as tiles 1320 in a grid arrangement. In other implementations, other visual arrangements of tiles 1320 may be implemented. A button 1330, or other graphical representation, may be provided through which a user may choose to share collection 1310. Selection of button 1330 may invoke an interface through which a user can choose methods through which collection 1310 is shared. In one implementation, possible services through which collection 1310 may be shared may include email or through social network 230. When sharing collection 1310 through email, the user may enter or select one or more email addresses, corresponding to other users of application store 210, to which collection 1310 may be shared. When sharing collection 1310 through a social network, the user may select one or more users that are connected to the user in the social network, to whom collection 1310 may be shared. Alternatively, the collection may be shared with all of the user's connections in the social network. When a collection is shared, other users with whom the collection is shared may be able to view and/or modify items in the collection.

As is additionally illustrated in interface 1300, a button 1340 may be provided, in the view of collection 1310, to install all of the application in collection 1310. Selection of button 1340, by the user, may cause all of the applications in collection 1310 to be installed.

As described above, collections may be used to assist users in organizing, browsing, and discovering applications in an application store.

The foregoing description provides illustration and description, but is not intended to be exhaustive or to limit the embodiments to the precise form disclosed. Modifications and variations are possible in light of the above teachings or may be acquired from practice of these embodiments.

For example, while series of blocks have been described with regard to FIGS. 5 and 6, the order of the blocks may be modified in other implementations. Further, non-dependent blocks may be performed in parallel. In addition, other blocks may be provided, or blocks may be eliminated, from the described flowcharts, and other components may be added to, or removed from, the described systems.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, steps, or components, but does not preclude the presence or addition of one or more other features, steps, components, or groups thereof.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the disclosed embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more devices, the method comprising:
   providing, by the one or more devices and to a client, a webpage of an online application store that presents, to a user of an online social network, a plurality of applications that are available, to the client, as applications for installation, the webpage providing a visual interface that includes:
      a first section that includes graphical representations of at least some of the plurality of applications; and
      a second section that provides one or more collections of applications, each corresponding to a subset of the plurality of applications, the one or more collections including a first collection selected for the webpage, from a plurality of collections that were created or edited by one or more other users, based on a ranking score, wherein the ranking score is determined at least based on a number of times that the subset of the plurality of applications were installed by social network users connected to the user in the social network during a predetermined period of time;
   receiving, by the one or more devices, a first user selection of a selected one of the one or more collections;
   providing, by the one or more devices and based on the first user selection, an indication of the applications that are included in the selected collection, the indication being provided in the first section of the visual interface;
   receiving, by way of a user-initiated drag and drop operation, a second user selection of an application displayed in the first section and indication of the selected application being placed into a graphic representation of a new collection displayed in the second section; and
   in response to the drag and drop operation, creating a second collection of one or more applications including the selected application, and facilitating adding a visual representation of the second collection to the second section.

2. The method of claim 1, where the plurality of applications include browser extensions that execute within a browser program.

3. The method of claim 1, where the plurality of applications include native applications for the client.

4. The method of claim 1, further comprising:
   receiving a third collection that was determined by an administrator of the one or more devices; and
   providing the third collection within the visual interface of the webpage.

5. The method of claim 1, where providing the webpage further includes:
   providing the webpage to include, in the first section, graphical representations of at least some of the one or more collections and the plurality of applications as graphical tiles arranged in a grid, each tile including an image associated with the corresponding collection or application and descriptive text for the corresponding collection or application.

6. The method of claim 1, where the one or more other users are associated with the user as contacts of the user in an online social network.

7. The method of claim 1, further comprising:
   determining a second collection, from the plurality of applications, based on an aggregation of two or more other ones of the one or more collections; and
   providing the second collection within the visual interface of the webpage.

8. The method of claim 7, where determining the second collection further includes:
   determining the second collection based on the aggregation of a plurality of the one or more collections, in which the plurality of the one or more collections includes collections that have a common title.

9. The method of claim 7, further comprising:
   providing, in the webpage, an interface to receive a title associated with a user created collection, the title being selected from a predetermined set of titles.

10. The method of claim 1, further comprising:
    assigning each of the one or more collections a unique uniform resource locator (URL).

11. One or more computing devices comprising:
    a memory to store instructions; and
    one or more processors, to execute the instructions, to:
       provide to a client, a webpage of an online application store that presents, to a user of an online social network, a plurality of applications that are available, to the client, as applications for installation, the webpage providing a visual interface that includes:
          a first section that includes graphical representations of at least some of the plurality of applications; and
          a second section that provides one or more collections of applications, each corresponding to a subset of the plurality of applications, the one or more collections including:
             a first collection that was created or edited by the user, and
             a second collection selected for the webpage, from a plurality of collections that were created or edited by one or more other users, based on a ranking score, wherein the ranking score is determined at least based on a number of times that the subset of the plurality of applications were installed by social network users connected to the user in the social network during a predetermined period of time;

receive a first user selection of a selected one of the one or more collections;

provide based on the first user selection, an indication of the applications that are included in the selected collection, the indication being provided in the first section of the visual interface;

receive, by way of a user-initiated drag and drop operation, a second user selection of an application included in the selected collection and indication of the selected application being placed into a graphic representation of a new collection displayed in the second section; and in response to the drag and drop operation, creating a third collection of one or more applications including the selected application, and facilitating adding a visual representation of the third collection to the second section.

12. The one or more computing devices of claim 11, where the one or more processors further execute instructions to:

determine a fourth collection, from the plurality of applications, based on an aggregation of two or more other ones of the one or more collections; and provide the fourth collection within the visual interface of the webpage.

13. The one or more computing devices of claim 11, where the one or more other users are associated with the user as contacts of the user in an online social network.

14. The one or more computing devices of claim 11, where the one or more processors further execute instructions to:

provide the webpage to include, in the first section, graphical representations of at least some of the one or more collections and the plurality of applications as graphical tiles arranged in a grid, each tile including an image associated with the corresponding collection or application and descriptive text for the corresponding collection or application.

15. The one or more computing devices of claim 11, where the plurality of applications include web applications or browser extensions that execute within a browser program.

16. A computer-readable medium comprising:

one or more instructions, which when executed by one or more processors of a computing device, cause the computing device to:

provide, to a client for display to a user of an online social network, a plurality of applications that are available as applications for installation from an online application store, the plurality of applications being visually represented as graphical tiles arranged in a grid;

provide for display, one or more collections, each corresponding to a subset of the plurality of applications, the one or more collections being provided for display as graphical tiles arranged in the grid and at least some of the one or more collections including collections that were generated by users of the online application store wherein the one or more collections are determined to be provided for display based on a number of times that the subset of the plurality of applications were installed by social network users connected to the user in the social network during a predetermined period of time;

receive, based on a drag and drop operation, an indication that one of the plurality of applications is to be added to one of the collections; and transmit, to the online application store, the indication that the one of the plurality of applications is to be added to the one of the collections.

17. The computer-readable medium of claim 16, further comprising:

one or more instructions, which when executed by the one or more processors of the computing device, provide an interface to obtain a social network with which at least one of the one or more collections is to be shared.

18. The computer-readable medium of claim 16, where the plurality of applications include web applications that execute within a browser program.

19. The computer-readable medium of claim 16, further comprising:

one or more instructions, which when executed by the one or more processors of the computing device, present an aggregated collection corresponding to a combined version of a plurality of identically titled collections.

20. The computer-readable medium of claim 16, further comprising:

one or more instructions, which when executed by the one or more processors of the computing device, cause the one or more processors to provide the one or more collections as graphical tiles that each include images corresponding to the subset of the plurality of applications that are included in the one or more collections.

* * * * *